(12) United States Patent
Manian et al.

(10) Patent No.: US 7,932,314 B2
(45) Date of Patent: Apr. 26, 2011

(54) ELECTRICALLY CONDUCTIVE THERMOPLASTIC POLYMER COMPOSITION

(75) Inventors: Hrishikesh Manian, Medina, OH (US); Nishant Negandhi, Medina, OH (US)

(73) Assignee: Ovation Polymer Technology and Engineered Materials, Inc., Cleveland, OH (US)

( * ) Notice: Subject to any disclaimer, the term of this patent is extended or adjusted under 35 U.S.C. 154(b) by 395 days.

(21) Appl. No.: 12/220,780

(22) Filed: Jul. 28, 2008

(65) Prior Publication Data

US 2010/0021717 A1 Jan. 28, 2010

(51) Int. Cl.
*C08K 3/04* (2006.01)
*G11C 5/12* (2006.01)

(52) U.S. Cl. .......... 524/496; 428/800; 29/737; 525/148; 525/67; 525/133; 525/69

(58) Field of Classification Search .................. 428/800; 524/496; 525/67, 69, 148, 133; 29/737
See application file for complete search history.

(56) References Cited

U.S. PATENT DOCUMENTS

| | | | | |
|---|---|---|---|---|
| 4,151,001 A * | 4/1979 | Anderson et al. | ............. | 106/270 |
| 6,066,806 A * | 5/2000 | Higashiura et al. | ........ | 174/110 R |
| 2004/0162219 A1* | 8/2004 | Hiroishi | ......................... | 503/201 |
| 2005/0271879 A1* | 12/2005 | Miura et al. | ................... | 428/412 |
| 2006/0117558 A1 | 6/2006 | Koh et al. | ........................ | 29/737 |
| 2007/0135570 A1* | 6/2007 | Krishnamurthy et al. | ...... | 525/67 |

* cited by examiner

*Primary Examiner* — Vasu Jagannathan
*Assistant Examiner* — Mark S Kaucher
(74) *Attorney, Agent, or Firm* — Alvin T. Rockhill

(57) ABSTRACT

This invention relates to a thermoplastic polymer composition that exhibits an excellent combination of properties for use in manufacturing shipping combs for use in conjunction with moving actuators for hard disk drives. The thermoplastic polymer composition of this invention is comprised of (1) from 10 weight percent to 90 weight percent polycarbonate, (2) from 1 weight percent to 6 weight percent carbon nanotubes, (3) from 5 weight percent to 85 weight percent of a sulfone polymer, (4) from 0.5 weight percent to 10 weight percent of a functionalized rubbery polymer, and (5) from 0.5 weight percent to 5 weight percent of a lubricant selected from the group consisting of high density polyethylene and polyester wax, wherein all weight percentages are based upon the total weight of the thermoplastic polymer composition.

16 Claims, 2 Drawing Sheets

ELECTRICALLY CONDUCTIVE THERMOPLASTIC POLYMER COMPOSITION

FIELD OF THE INVENTION

The present invention relates to a shipping comb for use when moving an actuator of a hard disk drive and, more particularly, to a shipping comb for use when moving an actuator of a hard disk drive having a structure which can prevent collision between sliders, each mounting a read/write head, during the movement of an actuator.

BACKGROUND OF THE INVENTION

A hard disk drive (HDD), which is one of a number of information storing devices for computers that reproduces data stored from a disk or records data on the disk using a read/write head. In the HDD, the read/write head is mounted on a slider installed on an actuator. The actuator moves the head to a desired position on the rotating disk. When the hard disk drive is not in use, that is, the rotation of the disk is stopped, the read/write head is "parked" at a position outside the recording surface of the disk to prevent the read/write head from colliding against the recording surface of the disk. For this purpose, a ramp is installed outside the disk and an end-tab supported by the ramp is provided on the suspension assembly. When the power of the hard disk drive is off and the disk stops rotation, a voice coil motor rotates the swing arm in a clockwise direction so that the end-tab is moved from the disk to the ramp and supported by the ramp.

During storage and/or transportation the actuator may be exposed to vibration or even worse jars caused by impact. In such a case, the sliders that are arranged to face each other may collide with each other and be damaged accordingly. To prevent this problem, a shipping comb is typically installed in the actuator. A typical shipping comb includes a frame, an installation rod and a handle provided at an end portion of the frame, and a finger provided at the other end portion of the frame. The installation rod of the shipping comb is inserted in an installation hole formed in the swing arm of the actuator while the finger is inserted between the load beams facing each other to maintain a constant gap between them. The handle is used to pivot the shipping comb.

It is reported that problems can still occur when conventional shipping combs are installed to actuators because sliders facing each other can still collide with each other and be damaged thereby. United States Patent Publication No. 2006/0117558 notes that the conventional shipping combs do not have any structure that directly prevents the collision between the sliders. Accordingly, during the transfer of the actuator, when a relatively large impact or vibration is applied to the actuator, the sliders can vibrate and thus the sliders facing each other may collide with each other. In this case, an air bearing surface of each of the sliders may be damaged or the head mounted thereon may be damaged so that the lifting ability of the slider or the read/write ability of the head may be deteriorated.

United States Patent Publication No. 2006/0117558 introduces a new shipping comb design that is reported to overcome these problems. More specifically, United States Patent Publication No. 2006/0117558 discloses a shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, the shipping comb comprising: a frame operative to be coupled to the actuator and capable of pivoting; a first finger provided at the frame and for maintaining an interval between the load beams by being inserted between the load beams; and a second finger provided at the frame and for preventing collision between the sliders by being inserted between the sliders.

SUMMARY OF THE INVENTION

This invention relates to a thermoplastic polymer composition that exhibits an excellent combination of properties for use in manufacturing shipping combs for use in conjunction with moving actuators for hard disk drives. For instance, the thermoplastic polymer compositions of this invention offers excellent solvent resistance to fluorinated ethers which offers increased wash cycles during product life thereby reducing system costs. Additionally it offers a unique combination of characteristics, including:

(1) electrical conductivity—resistivity in the range of $1.0 \times 10^4$ to $9.9 \times 10^8$ Ω/sq;
(2) processability—should be able to flow into thin sections and multicavity molds;
(3) stiffness—each tooth should be strong enough to hold the assembly sliders;
(4) thermal resistance—higher HDT is required for high temperature drying of these combs after each washing cycle;
(5) dimensional tolerance—important during manufacturing (shrinkage within limits) and stability during use and washing cycles; and
(6) impact—should not crack or break during use, transportation or washing.

Hot water is conventionally used to wash combs so that they can be cleaned, recycled and used again. Standard combs that are comprised of polycarbonate and carbon nanotubes can sustain about 20 washing cycles. However, today there is a move to utilize fluorinated ethers, such as HFE-7100, as a more effective solvent for washing shipping combs. The use of fluorinated ethers normally results in cleaner combs after washing. However, cleaning standard shipping combs that are comprised of polycarbonate and carbon nanotubes with fluorinated ether solvents frequently results in the combs becoming brittle, cracking, and failing. In fact, it has been found that more than 50% of shipping combs that are washed in fluorinated ether solvents become brittle and cracked.

The present invention is of particular value because shipping combs made with the thermoplastic polymer composition of this invention can be washed over and over again in fluorinated ether solvents without causing the combs to become brittle or to crack. This makes it possible to wash the shipping combs of this invention in fluorinated ethers which results in cleaner recycled combs of higher quality. In any case, the thermoplastic polymer compositions of this invention can be used in manufacturing shipping combs that offer higher temperature resistance and outstanding chemical resistance.

The thermoplastic polymer composition of this invention is comprised of (1) from 10 weight percent to 90 weight percent polycarbonate, (2) from 1 weight percent to 6 weight percent carbon nanotubes, (3) from 5 weight percent to 85 weight percent of a sulfone polymer, (4) from 0.5 weight percent to 10 weight percent of a functionalized rubbery polymer, and (5) from 0.5 weight percent to 5 weight percent of a lubricant selected from the group consisting of high density polyethylene and polyester wax, wherein all weight percentages are based upon the total weight of the thermoplastic polymer composition.

The present invention also relates to a shipping comb which is comprised of a frame, an installation rod, a handle, and a finger, wherein the shipping comb is comprised of a thermoplastic polymer composition which is comprised of (1) from 10 weight percent to 90 weight percent polycarbonate, (2) from 1 weight percent to 6 weight percent carbon nanotubes, (3) from 5 weight percent to 85 weight percent of a sulfone polymer, (4) from 0.5 weight percent to 10 weight percent of a functionalized rubbery polymer, and (5) from 0.5 weight percent to 5 weight percent of a lubricant selected from the group consisting of high density polyethylene and polyester wax, wherein all weight percentages are based upon the total weight of the thermoplastic polymer composition.

The subject invention further reveals a shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, the shipping comb comprising: a frame operative to be coupled to the actuator and capable of pivoting; a first finger provided at the frame and for maintaining an interval between the load beams by being inserted between the load beams; and a second finger provided at the frame and for preventing collision between the sliders by being inserted between the sliders, wherein the frame and the first finger are comprised of a thermoplastic polymer composition which is comprised of (1) from 10 weight percent to 90 weight percent polycarbonate, (2) from 1 weight percent to 6 weight percent carbon nanotubes, (3) from 5 weight percent to 85 weight percent of a sulfone polymer, (4) from 0.5 weight percent to 10 weight percent of a functionalized rubbery polymer, and (5) from 0.5 weight percent to 5 weight percent of a lubricant selected from the group consisting of high density polyethylene and polyester wax, wherein all weight percentages are based upon the total weight of the thermoplastic polymer composition.

DETAILED DESCRIPTION OF THE INVENTION

Figure 1:
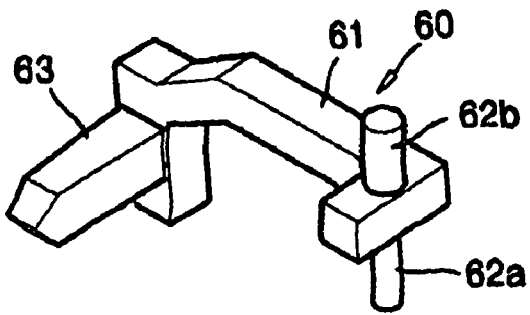
FIG. 1 is a perspective view of a conventional shipping comb that can be manufactured utilizing the thermoplastic composition comb of this invention.

Virtually any sulfone polymer can be utilized in the practice of this invention. For instance, the sulfone polymer can be a polyether sulfone, a polyphenylene sulfone or a polysulfone. It is typically preferred for the sulfone polymer to be a polyether sulfone.

The carbon nanotubes used in making the thermoplastic polymer compositions of this invention normally have a diameter which is within the range of 5 to 20 nanometers and have a length which is within the range of 1 to 5 microns. The carbon nanotubes used in making the thermoplastic polymer compositions of this invention more typically have a diameter which is within the range of 7 to 15 nanometers and have a length which is within the range of 1 to 3 microns. The carbon nanotubes used in making the thermoplastic polymer compositions of this invention preferably have a diameter which is within the range of 9 to 10 nanometers and have a length which is within the range of 1 to 2 microns. Such carbon nanotubes typically have an aspect ratio which is within the range of 80 to 180 and more typically have an aspect ratio which is within the range of 90 to 150. The carbon nanotubes used in making the thermoplastic polymer compositions of this invention preferably have an aspect ratio which is within the range of 95 to 120.

The functionalized rubbery polymer is typically an ethylene copolymer that functions as a compatibilizing agent or surfactant, in that it forms a covalent bond and/or physical interaction with the hard polyester component, and blends compatibly with the polyurethane component. In most cases, to get the high level of compatibility desired a covalent bond will form between the hard polyester component and the functionalized rubbery polymer. The functionalized rubbery polymer component of the thermoplastic elastomer composition will normally represent from 0.5 weight percent to 30 weight percent of the total composition. The functionalized rubbery polymer is preferably present in the thermoplastic elastomer composition at a level which is within the range of 3 weight percent to 15 weight percent.

The functionalized rubbery polymer will generally be a compatibilizing ethylene copolymer of the formula E/X/Y, where E is about 55-75%, X is about 15-35%, and Y is about 2-15% by weight of the compatibilizing ethylene copolymer, and E is ethylene, X is an α,β-ethylenically unsaturated monomer derived from at least one of alkylacrylate, alkylmethacrylate, alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. More specifically, X can, for example, consist of 0-35 weight percent of a moiety derived from at least one alkyl acrylate, alkyl methacrylate, or mixtures thereof where the alkyl groups contain 1-8 carbon atoms. Y is an α,β-ethylenically unsaturated monomer containing a reactive group, such as epoxide, maleic anhydride, isocyanate, or oxazoline, for example, that forms a covalent bond with said first polymeric component. In one preferred embodiment, Y is selected from the group consisting of glycidyl methacrylate and glycidyl acrylate, maleic anhydride, and isocyanato-ethylmethacrylate.

The functionalized rubbery polymer will typically contain repeat units that are derived from an acrylate monomer of the structural formula:

wherein R represents a hydrogen atom, an alkyl group containing from 1 to about 8 carbon atoms, or a moiety containing an epoxy group, and wherein $R^1$ represents a hydrogen atom or an alkyl group containing from 1 to about 8 carbon atoms. Some representative examples of monomers that can be used include methyl methacrylate, butyl acrylate, dimethylsiloxane. In many cases, R will represent an alkyl group containing from 1 to 4 carbon atoms. The moiety containing an epoxy group will typically be of the structural formula:

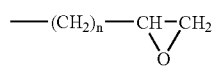

wherein n represents an integer from 1 to about 6. In most cases, n will represent 1.

The functionalized rubbery polymer will generally also contain repeat units that are derived from a conjugated diolefin monomer, such as 1,3-butadiene or isoprene, a vinyl aromatic monomer, such as styrene or α-methyl styrene, a monoolefin monomer, such as ethylene or propylene, and/or a dialkylsiloxane monomer, such as dimethylsiloxane.

The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step. Lotader® 8900 is a terpolymer of ethylene, methyl methacrylate and glycidyl methacrylate that can be used as the functionalized rubbery polymer in the practice of this invention.

The lubricant used in making the thermoplastic polymer compositions of this invention is either high density polyethylene or a polyester wax, such as Glycolube wax. It is frequently preferred to use a combination of high density polyethylene and a polyester wax in making the thermoplastic polymer compositions of this invention. For example, from 0.5 weight percent to 6 weight percent of polyester wax can be used as a lubricant in conjunction with 0.5 weight percent to 3 weight percent of high density polyethylene which is used to improve surface finishing characteristics.

The thermoplastic polymer compositions of this invention are made by a two step process. In the first step a portion of the polycarbonate (PC) is mixed with the carbon nanotubes and optionally additional components of the composition being made. The first mixing step results in the production of a PC/carbon nanotube premix. Then in the second step additional polycarbonate, the polyethersulfone (PES), the functionalized rubbery polymer, and the lubricant selected from the group consisting of high density polyethylene and polyester wax are dispersed throughout the PC/carbon nanotube premix made in step (1). In this mixing procedure from 25 weight percent to 70 weight percent of the total constituents of the thermoplastic polymer compostion are added in step (1) to make the premix. It is typically preferred for from 30 weight percent to 55 weight percent of the total constituents of the thermoplastic polymer compostion to be added in step (1) to make the premix.

This mixing will typically be done by melt blending the components of the thermoplastic polymer composition. This can be done in a suitable mixing device for melt blending, such as a single or twin screw extruder or multiple mixing devices with controlled specific energy input via control of feed rate (15 to 95% torque), RPM (60 to 900 rpm), process temperature and residence time distribution. The specific energy input will typically be within the range of 0.1 to 0.5 kilowatt hours per kilogram and will more typically be within the range of 0.2 to 0.4 kilowatt hours per kilogram.

The thermoplastic polymer compositions of this invention will typically contain (1) 10 weight percent to 90 weight percent polycarbonate, (2) from 1 weight percent to 6 weight percent of the carbon nanotubes, (3) from 5 weight percent to 85 weight percent polyethersulfones, (4) from 0.5 weight percent to 10 weight percent of the functionalized rubbery polymer, and (5) from 0.5 weight percent to 5 weight percent of the lubricant selected from the group consisting of high density polyethylene and polyester wax. It should be noted that if lubricants are used at levels in excess of about 5 weight percent phase separation can occur. The thermoplactic polymer compositions of this invention will preferably contain (1) 45 weight percent to 80 weight percent polycarbonate, (2) from 1.5 weight percent to 5 weight percent of the carbon nanotubes, (3) from 10 weight percent to 50 weight percent polyethersulfones, (4) from 0.8 weight percent to 7 weight percent of the functionalized rubbery polymer, and (5) from 0.8 weight percent to 4 weight percent of the lubricant. The thermoplastic polymer compositions of this invention will most preferably contain (1) 65 weight percent to 75 weight percent polycarbonate, (2) from 2 weight percent to 4 weight percent of the carbon nanotubes, (3) from 15 weight percent to 85 weight percent polyethersulfones, (4) from 1 weight percent to 5 weight percent of the functionalized rubbery polymer, and (5) from 1 weight percent to 3 weight percent of the lubricant. This thermoplastic polymer composition can optionally contain small amounts (level of less than about 1 weight percent) of thermal stabilizers, UV stabilizers, antioxidants, and/or flame retardants.

The thermoplastic polymer compositions of this invention can then be injection molded into disk drive head suspension assembly trays of various desired designs. Disk drive head suspension assembly trays that can be made by injection molding the thermoplastic polymer compositions of this invention are described in United States Patent Publication No. 2006/0117558. The teachings of United States Patent Publication No. 2006/0117558 are incorporated herein by reference for the purpose of illustrating shipping combs that can be beneficially made by injection molding the thermoplastic polymer compositions of this invention.

FIG. 1 illustrates a conventional shipping comb 60 including a frame 61, an installation rod 62a and a handle 62b provided at an end portion of the frame 61, and a finger 63 provided at the other end portion of the frame 61. The installation rod 62a of the shipping comb 60 is adapted to be inserted in an installation hole in the swing arm of an actuator while the finger 63 is adapted to be inserted between the load beams facing each other to maintain a constant gap between them. The handle 62b is used to pivot the shipping comb 60.

Figure 2:
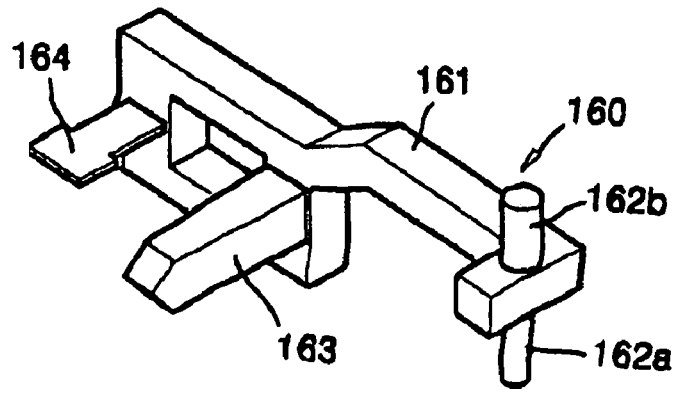
FIG. 2 is a perspective view of another conventional shipping comb having a second finger.

FIG. 2 illustrates a shipping comb of a design disclosed in United States Patent Publication No. 2006/0117558. This design is touted as having better capability to keep sliders facing each other from colliding with each other and accordingly helps to prevent damage thereto. This shipping comb 160 includes a frame 161, a handle 162b, an installation rod 162a, a first finger 163, and a second finger 164. In this design the tip end portion of the first finger 163 is inclined to be easily inserted between load beams.

Figure 3:
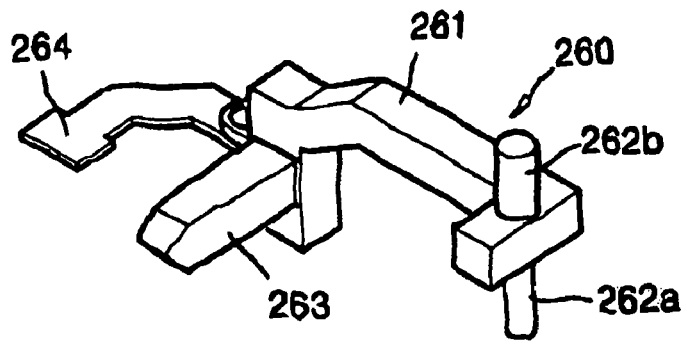
FIG. 3 is a perspective view of another conventional shipping comb having a second finger of an alternative design.

FIG. 3 illustrates a shipping comb of another design disclosed in United States Patent Publication No. 2006/0117558. This shipping comb 260 includes a frame 261, a handle 262b, an installation rod 262a, a first finger 263, and a modified second finger 264. The second finger 264 has a thickness smaller than the interval between the sliders 144. The second finger 264 has a thickness smaller than the interval between the sliders. The tip end portion of the second finger 264 may have a shape corresponding to the shape of each of the sliders, for example, a rectangular shape having an area larger than that of each of the sliders.

This invention is illustrated by the following examples that are merely for the purpose of illustration and are not to be regarded as limiting the scope of the invention or the manner in which it can be practiced. Unless specifically indicated otherwise, parts and percentages are given by weight.

In the following examples Izod impact testing was done on injection molded specimens with notches being cut according to ASTM D256. Samples identified as "non-soaked specimens" were not immersed in any solvent and the samples identified as "soaked specimens" were immersed in HFE-7100 for approximately 2 hour at room temperature (about 22° C.). In the test procedure used "A specimens" were tested in accordance with ASTM D256 with no HFE-7100 being streamed onto the test specimens and "B specimens" were tested in accordance with ASTM D256 with HFE-7100 being streamed onto the test specimens upon impact of the hammer of the Izod test machine.

The thermoplastic polymer compositions described in the following examples were made by a two step melt extrusion compounding process in a ZE 25 twin screw extruder (L/D=44). The main feeder of the ZE 25 twin screw extruder was operated at a rate of 400 rpm and with a set temperature profile of 40° C. (feed), 260° C. (Zone 2), 285° C. (Zone 3), 300° C. (Zone 4), 310° C. (Zone 5), 310° C. (Zone 6), 290° C. (Zone 7), 290° C. (Zone 8), and 285° C. (die). Carbon nanotube masterbatch formulations were made in the first mixing step. In the following tables these carbon nanotube masterbatches are designated by an asterisk (*) and includes all of the materials identified above them in the table. Materials which were subsequently added to the carbon nanotube masterbatches are in the rows following the items designated with asterisks in the tables. The levels at which each material was employed is reported in parts by weight. The materials used in the following Examples are abbreviated as follows:

| Abbreviation | Material |
|---|---|
| PC 1125WX, PC 1125L, PC1250Y | High density polyethylene with melt flow index of 10 grams per 10 minutes at 300° C. and 1.2 kg |
| HDPE 511051 | Polycarbonate with melt flow index of 25 grams per 10 minutes at 190° C. and 2.16 kg |
| C150P, NC7000, Zyvex MWCNT | Multi-walled carbon nanotubes |
| CBT100 | Cyclic polybutylene terephthalate |
| Lotader 8900, Lotader 4700 | Terpolymer of ethylene, methyl methacrylate and glycidyl methacrylate |
| Glycolube P | Polyester wax |
| D440 | Core-shell acrylic based impact modifier |
| PES 2010 | Polyether sulfone |
| PP/LDPE Blend | Blend of polypropylene with low density polyethylene |
| TOHO A201 | Carbon fiber |
| PBT CX11051 | Medium viscosity polybutylene terephthalate |
| Printex XE2 | High surface area conductive carbon black |

EXAMPLES 1-11

The thermoplastic polymer compositions of this invention were made utilizing a ZE 25 twin screw extruder (L/D=44). The main feeder of the ZE 25 twin screw extruder was operated at a rate of 400 rpm and with a set temperature profile of 40° C. (feed), 260° C. (Zone 2), 285° C. (Zone 3), 300° C. (Zone 4), 310° C. (Zone 5), 310° C. (Zone 6), 290° C. (Zone 7), 290° C. (Zone 8), and 285° C. (die). The components used in making such thermoplastic polymer compositions and the levels utilized in reported in the following tables.

TABLE 1

CP 285

| Material | EXAMPLE 1 | EXAMPLE 2 |
|---|---|---|
| PC 1225WX | 94 | 40.7 |
| HDPE 511051 | | 2 |
| CP 285 X1* | | 51.8 |
| C150P | 6 | |
| Lotader 8900 | | 3 |
| Glycolube P | | 0.5 |
| D440 | | 2 |
| Properties | | |
| Resistance - Strand (Ohms/sq) | 6.0E+03 | |

TABLE 2

CP 289

| Material | EXAMPLE 3 | EXAMPLE 4 |
|---|---|---|
| PC 1225L | 96 | |
| PES 2010 | | 17 |
| HDPE 511051 | | 1.5 |
| CBT 100 | | 1 |
| CP 289 X1* | | 78 |
| NC 7000 | 4 | |
| Lotader 8900 | | 2.5 |

No Properties

TABLE 3

CP 143

| Material | EXAMPLE 5 | EXAMPLE 6 | EXAMPLE 7 | EXAMPLE 8 |
|---|---|---|---|---|
| PC 1225WX | 98 | 97 | 98.5 | 90 |
| NC 7000 | 2 | 3 | 1.5 | 10 |
| Properties | | | | |
| Resistance - Strand (Ohms/sq) | 1.3E+04 | 3.8E+03 | 7.5E+03 | 2.2E+02 |
| Resistance - Probe (Ohms/sq) | | 1.1E+04 | 1.7E+04 | |

TABLE 4

CP 220

| Material | EXAMPLE 9 | EXAMPLE 10 | EXAMPLE 11 |
|---|---|---|---|
| PC 1225L | 93.5 | 71.5 | 55.5 |
| PES 2010 | | 20 | 35 |
| HDPE 511051 | 2 | 2 | 2 |
| NC 7000 | 4.5 | 4.5 | 4.5 |
| Lotader 8900 | | 2 | 3 |
| Properties | | | |
| Resistance - Probe (Ohms/sq) | 8.7E+03 | 2.5E+03 | 7.0E+03 |
| Tensile Modulus (Mpa) | 2063 | 1818 | 1890 |
| Tensile Stress @YLD (Mpa) | 62.7 | 63.6 | 59.9 |
| Tensile Stress @BRK (Mpa) | 63 | 62 | 53.3 |
| Tensile Strain @BRK (%) | 5 | 6.8 | 4.2 |
| Flex Modulus (Mpa) | 2386 | 2495 | 2349 |
| Flex Stress (Mpa) | 93.5 | 97.1 | 93.3 |
| Izod Impact @RT (ft-lb/in) | 1.99 CB | 1.46 CB | 1.33 CB |
| HDT @264 psi (° C.) | 129.2 | 130 | 136.5 |
| Specific Gravity | 1.199 | 1.2268 | 1.2475 |

Figure 4:
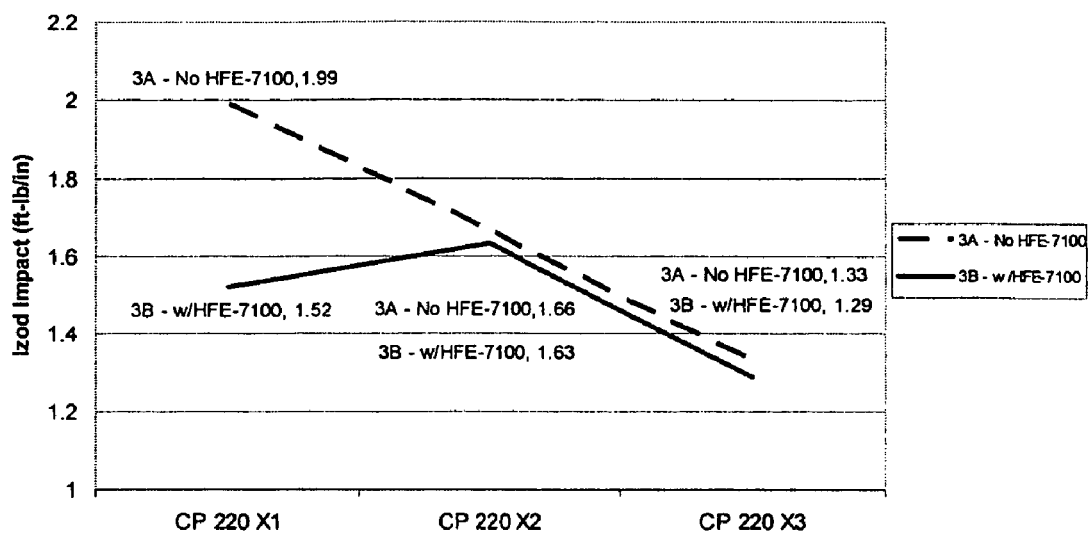
FIG. 4 is a plot of Izod impact strength for specimens before and after being subjected to immersion in HFE 7100 fluorinated ether solvent.

Test specimens for Izod impact strength testing were made as previously explained. The results of this Izod impact testing is shown in FIG. 4. As can be seen in FIG. 4, the specimens that did not contain polyether sulfone (Example 9) showed a significant decrease in impact strength after exposure to HFE solvent. To the contrary, the specimens made with the thermoplastic polymer containing polyether sulfone (Examples 10 and 11) retained more than 95% of the original impact strength.

COMPARATIVE EXAMPLES 12-47

The thermoplastic polymer compositions made in the following series of experiments (Examples 12-47) were made of comparative purposes.

TABLE 5

CP 220M

| Material | EXAMPLE 12 | EXAMPLE 13 | EXAMPLE 14 |
|---|---|---|---|
| PC 1225WX | 68.25 | | 40 |
| PC 1225L | | 24 | |
| PBS 2010 | 20 | | |
| HDPE 511051 | 2 | | |
| PP/LDPE Blend | | | 2 |
| CBT 100 | 3 | | |
| CP 220 X2M* | | 74 | 60 |
| C150P | 4 | | |
| Lotader 8900 | 2 | | |
| Glycolube P | 0.75 | | |
| Properties | | | |
| Resistance - Probe (Ohms/sq) | 3.8E+05 | | |
| Resistance - Surface (Ohms/sq) | 4.5E+03 | | |
| Resistance - Volume (Ohms/sq) | 3.3E+03 | | |

TABLE 6

CP 221

| Material | EXAMPLE 15 | EXAMPLE 16 |
|---|---|---|
| PC 1225WX | 88.25 | 85.25 |
| HDPE 511051 | 2 | 2 |
| NC7000 | 4 | 4 |
| TOHO A201 | 5 | 8 |
| Glycolube P | 0.75 | 0.75 |
| Properties | | |
| Resistance - Probe (Ohms/sq) | 4.1E+03 | 9.7E+03 |
| Tensile Modulus (Mpa) | 3883 | 4145 |

TABLE 6-continued

CP 221

| Material | EXAMPLE 15 | EXAMPLE 16 |
|---|---|---|
| Tensile Stress @YLD (Mpa) | 75.8 | 75.6 |
| Tensile Stress @BRK (Mpa) | 75.6 | 78.2 |
| Tensile Strain @BRK (%) | 2.8 | 2.7 |
| Flex Modulus (Mpa) | 4786 | 5317 |
| Flex Stress (Mpa) | 122.7 | 130.4 |
| Izod Impact @RT (ft-lb/in) | 1.36 CB | 1.40 CB |
| HDT @264 psi (° C.) | 139.2 | 138.8 |
| Specific Gravity | 1.221 | 1.2317 |
| MI @300 C, 5.0 kg (g/10 min) | 6.2 | 6.7 |

TABLE 7

CP 240

| Material | EXAMPLE 17 | EXAMPLE 18 | EXAMPLE 19 | EXAMPLE 20 | EXAMPLE 21 |
|---|---|---|---|---|---|
| PC 1225WX | 95.8 | | | 68.1 | 68.1 |
| PES 2010 | | 95.8 | | 20 | |
| HDPE 511051 | | | | 2 | 2 |
| CBT 100 | | | | 3 | 3 |
| PBT CX11051 | | | 95.8 | | 20 |
| C150P | 4.2 | 4.2 | 4.2 | 4.2 | 4.2 |

No Properties

TABLE 8

CP 245

| Material | EXAMPLE 22 | EXAMPLE 23 | EXAMPLE 24 |
|---|---|---|---|
| PC 1225WX | | | 40 |
| PC 1225L | 25 | 33 | |
| CP 220 X2M* | | | 60 |
| CP 240 X4* | 75 | 67 | |

No Properties

TABLE 9

CP 262

| Material | EXAMPLE 25 | EXAMPLE 26 |
|---|---|---|
| PC 1250Y | 23 | 15 |
| PES 2010 | 6 | 4 |
| CP 220 X2M* | 70 | 80 |
| Lotader 8900 | 1 | 1 |

No Properties

TABLE 10

CP 264

| Material | EXAMPLE 27 | EXAMPLE 28 | EXAMPLE 29 |
|---|---|---|---|
| PC 1225WX | 90 | | |
| PC 1225L | | 18.7 | 15 |
| PES 2010 | | 20 | 20 |
| HDPE 511051 | | 2 | 2 |
| CP 264 X1* | | 58.3 | 62 |

TABLE 10-continued

| | CP 264 | | |
|---|---|---|---|
| Material | EXAMPLE 27 | EXAMPLE 28 | EXAMPLE 29 |
| CBT 100 | 3 | | |
| NC 7000 | 6 | | |
| Lotader 8900 | 1 | 1 | 1 |
| Properties | | | |
| Resistance - Strand (Ohms/sq) | | 4.8E+02 | 5.5E+02 |

TABLE 11

| | CP 271 | | | | | |
|---|---|---|---|---|---|---|
| Material | EXAMPLE 30 | EXAMPLE 31 | EXAMPLE 32 | EXAMPLE 33 | EXAMPLE 34 | EXAMPLE 35 |
| PC 1225WX | 86 | 85 | | | | |
| PC 1225L | | | 41.2 | 19.6 | 29.7 | 17.8 |
| HDPE 511051 | 3 | 3 | 2 | 2 | 2 | 2 |
| CBT 100 | 3 | 3 | 2 | 2 | 2 | 2 |
| CP 271 X1* | | | 53 | 46 | 50 | 34 |
| CP 271 X2* | | | | 28.6 | 14.5 | 43 |
| C150P | 6 | | | | | |
| Printex XE2 | | 7 | | | | |
| Lotader 8900 | 1 | 1 | 1 | 1 | 1 | 1 |
| Glycolube P | 1 | 1 | 0.75 | 0.75 | 0.75 | 0.75 |
| Properties | | | | | | |
| Resistance - Strand (Ohms/sq) | 5.2E+02 | 1.4E+03 | 1.1E+04 | 4.5E+03 | 6.9E+03 | 6.1E+03 |

TABLE 12

| CP 276 | |
|---|---|
| Material | EXAMPLE 36 |
| PC 1225WX | 83 |
| HDPE 511051 | 3 |
| CBT 100 | 3 |
| Printex XE2 | 9 |
| Lotader 8900 | 1 |
| Glycolube P | 1 |
| No Properties | |

TABLE 13

| | CP 277 | | | | |
|---|---|---|---|---|---|
| Material | EXAMPLE 37 | EXAMPLE 38 | EXAMPLE 39 | EXAMPLE 40 | EXAMPLE 41 |
| PC 1250Y | 78.5 | 86 | 90.5 | 90 | 90.5 |
| HDPE 511051 | 2 | 2 | 2 | 2 | 2 |
| CBT 100 | 3 | 3 | 3 | 3 | 3 |
| NC 7000 | | | 3.5 | 4 | |
| Zyvex MWCNT | | | | | 3.5 |
| Printex XE2 | | 8 | | | |
| XC 72 | 15.5 | | | | |
| Glycolube P | 1 | 1 | 1 | 1 | 1 |
| Properties | | | | | |
| Resistance - Strand (Ohms/sq) | 1.0E+03 | 3.5E+03 | 4.1E+02 | 7.4E+02 | |

TABLE 14

CP 278

| Material | EXAMPLE 42 | EXAMPLE 43 |
|---|---|---|
| PC 1225L | 30 | 40 |
| CP 220 X2M* | 70 | 60 |
| Properties | | |
| Resistance - Strand (Ohms/sq) | 1.3E+04 | 3.6E+04 |

TABLE 15

CP282

| Material | EXAMPLE 44 | EXAMPLE 45 | EXAMPLE 46 | EXAMPLE 47 |
|---|---|---|---|---|
| PC 1225L | 35.5 | 30.5 | 25.5 | 76.9 |
| HDPE 511051 | 2 | 2 | 2 | |
| CP 281 X1* | 57 | 62 | 67 | |
| CP 275 X2/X3* | | | | 15 |
| NC 7000 | | | | 2.1 |
| Lotader 4700 | | | | 3 |
| Lotader 8900 | 3 | 3 | 3 | 3 |
| Glycolube P | 0.5 | 0.5 | 0.5 | |
| D440 | 2 | 2 | 2 | |

It should be noted that notched izod impact decreased with increasing levels of modifier, but chemical resistance appeared to be increasing with increased levels of modifier. Surprisingly, with the addition of PES the reduction in impact values was nil.

The thermoplastic polymer compositions of this invention were extruded to achieve an excellent balance of properties including excellent ESD (conductivity), excellent processibility, outstanding cleanliness, and excellent chemical resistance. The high level of chemical resistance attained allows for a very high number of washing cycles during the service life of products made with the thermoplastic polymer compositions. Using the thermoplastic polymer composition of this invention in manufacturing such products also reduces overall product costs.

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic polymer composition which is comprised of (1) from 10 weight percent to 90 weight percent polycarbonate, (2) from 1 weight percent to 6 weight percent carbon nanotubes, (3) from 5 weight percent to 85 weight percent of a polyethersulfone polymer, (4) from 0.5 weight percent to 10 weight percent of a functionalized rubbery polymer, and (5) from 0.5 weight percent to 5 weight percent of high density polyethylene as a lubricant, wherein all weight percentages are based upon the total weight of the thermoplastic polymer composition.

2. A thermoplastic polymer composition as specified in claim 1 wherein the carbon nanotubes have a diameter which is within the range of 5 nanometers to 20 nanometers and a length which is within the range of 1 micron to 5 microns.

3. A thermoplastic polymer composition as specified in claim 1 wherein the carbon nanotubes have a diameter which is within the range of 7 nanometers to 15 nanometers and a length which is within the range of 1 micron to 3 microns.

4. A thermoplastic polymer composition as specified in claim 1 wherein the carbon nanotubes have an aspect ratio which is within the range of 80 to 180.

5. A thermoplastic polymer composition as specified in claim 2 wherein the carbon nanotubes have an aspect ratio which is within the range of 90 to 150.

6. A thermoplastic polymer composition as specified in claim 3 wherein the carbon nanotubes have an aspect ratio which is within the range of 95 to 120.

7. A thermoplastic polymer composition as specified in claim 1 wherein the functionalized rubbery polymer is a terpolymer of ethylene, methyl methacrylate, and glycidyl methacrylate.

8. A thermoplastic polymer composition as specified in claim 1 wherein the carbon nanotubes are present at a level which is within the range of 1.5 weight percent to 5 weight percent.

9. A thermoplastic polymer composition as specified in claim 1 wherein the polyethersulfone is present at a level which is within the range of 10 weight percent to 50 weight.

10. A thermoplastic polymer composition as specified in claim 1 wherein the functionalized rubbery polymer is present at a level which is within the range of 2 weight percent to 8 weight percent.

11. A thermoplastic polymer composition as specified in claim 1 wherein the lubricant is present at a level which is within the range of 0.8 weight percent to 4 weight percent.

12. A thermoplastic polymer composition as specified in claim 1 wherein the carbon nanotubes are present at a level which is within the range of 2 weight percent to 4 weight percent.

13. A thermoplastic polymer composition as specified in claim 12 wherein the polyethersulfone is present at a level which is within the range of 15 weight percent to 25 weight.

14. A thermoplastic polymer composition as specified in claim 13 wherein the functionalized rubbery polymer is present at a level which is within the range of 1 weight percent to 5 weight percent, and wherein the lubricant is present at a level which is within the range of 1 weight percent to 3 weight percent.

15. A shipping comb which is comprised of a frame, an installation rod, a handle, and a finger, wherein the shipping comb is comprised of a thermoplastic polymer composition which is comprised of (1) from 10 weight percent to 90 weight percent polycarbonate, (2) from 1 weight percent to 6 weight percent carbon nanotubes, (3) from 5 weight percent to 85 weight percent of a polyethersulfone polymer, (4) from 0.5 weight percent to 10 weight percent of a functionalized rubbery polymer, and (5) from 0.5 weight percent to 5 weight percent of high density polyethylene as a lubricant wherein all weight percentages are based upon the total weight of the thermoplastic polymer composition.

16. A shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, the shipping comb comprising: a frame operative to be coupled to the actuator and capable of pivoting; a first finger provided at the frame and for maintaining an interval between the load beams by being inserted between the load beams; and a second finger provided at the frame and for preventing collision between the sliders by being inserted between the sliders, where in the frame and the first finger are comprised of a thermoplastic polymer composition which is comprised of (1) from 10 weight percent to 90 weight percent polycarbonate, (2) from 1 weight percent to 6 weight percent carbon nanotubes, (3) from 5 weight percent to 85 weight percent of a polyethersulfone polymer, (4) from 0.5 weight percent to 10 weight percent of a functionalized rubbery polymer, and (5) from 0.5 weight percent to 5 weight percent of high density polyethylene as a lubricant, wherein all weight percentages are based upon the total weight of the thermoplastic polymer composition.

* * * * *